US010689494B2

(12) United States Patent
Segal et al.

(10) Patent No.: US 10,689,494 B2
(45) Date of Patent: Jun. 23, 2020

(54) POLYMERIC SHEETS AND ARTICLES WRAPPED THEREWITH

(71) Applicant: Polysack Plastic Industries Ltd., D.n. Negev (IL)

(72) Inventors: Maor Segal, D.n. Negev (IL); Yoav Guthman, D.n. Negev (IL); Aharon Ben-Soussane, Beer Sheva (IL); Yiftach Nir, Yokneam Illit (IL)

(73) Assignee: POLYSACK FLEXIBLE PACKAGING LTD., D.N. Negev (IL)

( * ) Notice: Subject to any disclaimer, the term of this patent is extended or adjusted under 35 U.S.C. 154(b) by 0 days.

(21) Appl. No.: 14/209,660

(22) Filed: Mar. 13, 2014

(65) Prior Publication Data

US 2014/0194587 A1    Jul. 10, 2014

Related U.S. Application Data

(63) Continuation of application No. 11/989,783, filed as application No. PCT/IL2006/000893 on Aug. 3, 2006, now abandoned.

(60) Provisional application No. 60/705,195, filed on Aug. 4, 2005.

(30) Foreign Application Priority Data

Jan. 31, 2006   (DE) .................... 20 2006 001 454 U

(51) Int. Cl.
| | | |
|---|---|---|
| *B32B 27/32* | (2006.01) | |
| *B65C 3/00* | (2006.01) | |
| *C08J 5/18* | (2006.01) | |
| *C08L 23/06* | (2006.01) | |
| *C08L 25/06* | (2006.01) | |
| *B32B 27/08* | (2006.01) | |
| *B32B 27/36* | (2006.01) | |
| *C08L 23/08* | (2006.01) | |
| *C08L 67/03* | (2006.01) | |
| *C08L 57/00* | (2006.01) | |
| *B65C 3/06* | (2006.01) | |
| *B65C 9/00* | (2006.01) | |
| *C08L 45/00* | (2006.01) | |

(52) U.S. Cl.
CPC ............... *C08J 5/18* (2013.01); *B32B 27/08* (2013.01); *B32B 27/32* (2013.01); *B32B 27/322* (2013.01); *B32B 27/36* (2013.01); *B65C 3/00* (2013.01); *B65C 3/06* (2013.01); *B65C 9/00* (2013.01); *C08L 23/06* (2013.01); *C08L 23/0815* (2013.01); *C08L 25/06* (2013.01); *C08L 57/00* (2013.01); *C08L 67/03* (2013.01); *B32B 2250/24* (2013.01); *B32B 2307/412* (2013.01); *B32B 2307/75* (2013.01); *B32B 2439/70* (2013.01); *B32B 2519/00* (2013.01); *C08J 2323/08* (2013.01); *C08J 2325/08* (2013.01); *C08J 2423/06* (2013.01); *C08L 23/0823* (2013.01); *C08L 45/00* (2013.01); *Y10T 428/1352* (2015.01); *Y10T 428/24942* (2015.01); *Y10T 428/31797* (2015.04)

(58) Field of Classification Search
CPC ....... B65D 23/0878; B65C 1/04; B65C 3/163; B32B 27/08; B32B 2250/03; B32B 2250/04; B32B 2307/516; B32B 2307/736; B29K 2995/0049
USPC ..... 428/35.2, 35.7, 212, 219, 327, 480, 482, 428/483, 500, 516, 519, 523, 910
See application file for complete search history.

(56) References Cited

U.S. PATENT DOCUMENTS

| | | | |
|---|---|---|---|
| 3,796,785 A | | 3/1974 | Rest et al. |
| 4,016,706 A | | 4/1977 | Braker et al. |
| 4,734,317 A | * | 3/1988 | Bothe ................ B32B 27/32 428/215 |
| 4,980,014 A | | 12/1990 | Di Frank |
| 5,184,379 A | | 2/1993 | Bloo et al. |
| 5,756,577 A | | 5/1998 | Gutierrez-Villarreal |
| 5,879,496 A | * | 3/1999 | Bright et al. .............. 156/86 |
| 6,025,079 A | | 2/2000 | Ciocca et al. |
| 6,048,608 A | | 4/2000 | Peet et al. |
| 6,375,781 B1 | | 4/2002 | Wojcik et al. |
| 6,579,584 B1 | | 6/2003 | Compton |
| 6,680,091 B2 | | 1/2004 | Buch-Rasmussen |
| 2002/0192412 A1 | * | 12/2002 | Satani .............. B32B 27/32 428/35.7 |
| 2004/0072002 A1 | * | 4/2004 | Hashioka et al. ......... 428/515 |
| 2004/0126518 A1 | | 7/2004 | Mendes et al. |
| 2005/0118406 A1 | * | 6/2005 | Shelby et al. ........... 428/304.4 |
| 2005/0119359 A1 | | 6/2005 | Shelby et al. |

(Continued)

FOREIGN PATENT DOCUMENTS

| | | |
|---|---|---|
| EP | 1153947 A1 | 11/2001 |
| JP | 2000-202951 A | 7/2000 |

(Continued)

OTHER PUBLICATIONS

Mistui Chemical America, "APEL Cyclo Olefin Copolymers (COC) Properties", <<http://www.mitsuichemicals.com/apel_prop.htm>>.

(Continued)

*Primary Examiner* — Lee E Sanderson
(74) *Attorney, Agent, or Firm* — Fay Sharpe LLP

(57) ABSTRACT

A polymeric sheet having low density and comprising a low to non-existent amount of cyclic olefinic polymers (COP) and/or cyclic olefinic copolymers (COC). The overall density of the sheet may be lower than water. The sheet may be stretched and then heat shrinked onto an article. The sheet may be used as a label or package to wrap articles therewith.

4 Claims, No Drawings

(56) References Cited

U.S. PATENT DOCUMENTS

2007/0098933 A1* 5/2007 Opuszko ............... B32B 27/08
428/35.2
2009/0220757 A1* 9/2009 Patel ................... B32B 27/08
428/212

FOREIGN PATENT DOCUMENTS

WO 2001/000408 A1 1/2001
WO 2005/075296 A1 8/2005

OTHER PUBLICATIONS

Allcock, H. et al., "Morphology, Glass Transitions, and Polymer Crystallinity", Contemporary Polymer Chemistry, Englewood Cliffs, NJ: Prentice Hall (1990), pp. 443-438.

Final Office Action dated Sep. 13, 2013 in U.S. Appl. No. 11/989,783 (14 pages).

Non-Final Office Action dated Jan. 31, 2014 in U.S. Appl. No. 13/973,264 (14 pages).

Third Party Submission Under 37 CFR 1.290 in U.S. Appl. No. 13/973,281; dated Feb. 24, 2014 (63 pages).

Third Party Submission Under 37 CFR 1.290 in U.S. Appl. No. 13/973,264; dated May 2, 2014 (62 pages).

Polysack Flexible Packaging Ltd., Gatorade Packaging Information Sheet, www.polyphane.com (2 pages).

Polyphane FIT Patent 2013 PowerPoint Presentation, "Technologies review", (1 page).

Beverage Innovation Awards (Sep. 2009), "Best Labelling or Decorative Finish", Storaeno, www.foodbev.com/beverage (1 page).

Polysack Flexible Packaging Ltd., San Benedetto Packaging Information Sheet, www.polyphane.com (2 pages).

H & N Group, "Special Packaging for Special Occassions", Packaging Unlimited—Ideas, Concepts, Solutions (2005), No. 10 (4 pages).

Sparenberg, Films Sheets Laminates, VDI Dusseldorf, 2003.

Sparenberg, B., Films, Sheets, Laminates, VDI Laminates.

Plastic News Mar. 2003 on line Crain Communications.

Ticona Topas Product bulletin, Mar. 2003 New Jersey.

* cited by examiner

POLYMERIC SHEETS AND ARTICLES WRAPPED THEREWITH

FIELD OF THE INVENTION

This invention relates to polymeric sheets, for example such sheets comprising cyclic olefinic polymers (COP) and/or cyclic olefinic copolymers (COC). The relation also relates to articles wrapped with such polymeric sheets.

BACKGROUND OF THE INVENTION

In recent years, some novel substances have become commercially available under the generic titles of cyclic olefinic polymers (COP) and cyclic olefinic copolymers (COC). These substances are known for a variety of uses, such as manufacture of optical lenses, packaging of pharmaceuticals, packaging for candies, and others.

Another known use of such polymers, is in manufacturing of bidirectionally oriented polymeric sheets and unidirectionally oriented polymeric sheets, in which the orientation is in the transverse direction (TD). The latter sheets are useful as sleeves for unidirectionally shrinkable packaging of bottles.

Films that were shrunk in the transverse direction and contained at least 60% COC and/or COP were reported to closely follow a bottle's shape without creasing.

SUMMARY OF THE INVENTION

It has been surprisingly found by the inventors, that the properties of closely following bottle's shape without creasing, may be achieved with polymeric sheets comprising COC and/or COP (hereinafter COC/COP) even when they include less than 50% COC/COP, if these sheets are stretched monoaxially, preferably in the machine direction.

In the present application and claims the term "monoaxial shrinkage" means shrinkage along one direction or axis of a sheet, for example the machine direction, whilst the direction or axis essentially perpendicular thereto, in this case the transverse direction, retains the sheet's original dimension, or else changes by no more than 5%-10%.

Thus, according to a first aspect thereof, the present invention provides a polymeric sheet stretched along the machine direction, and comprising 50% or less, preferably 40% or less, most preferably about 30% of COC/COP.

In the present description and claims, unless otherwise is indicated, percentages represent the weight of the COC/COP out of the weight of the entire sheet or film.

The invention also provides articles wrapped in polymeric sheets as described above in a wrap-around method, sleeving and twist-wrap method.

Sheets for, use in wrap-around or sleeving applications preferably have thickness of from about 40 to about 50 μm, whereas sheets used in twist wrap method according to the invention have preferably thickness of from about 20 to about 30 μm.

The sheet of the invention, whether being suitable for wrap-around, for sleeving, for twist wrapping, or for any other purpose may be made of a blend comprising COC/COP and other polymeric substances, such as mLLDPE (metallocene linear low density polyethylene), LLDPE (linear low density polyethylene), Copo PP (copolymer polypropylene), polystyrenes like PS (polystyrene) and SBC (styrene-butadiene copolymers), polyesters like PET (poly (ethylene terephthalate)) and PETg (Poly (ethylene terephthalate) glycol), and polymers of non-cyclic olefins, such as polyethylene, polypropylene, and ethylene propylene copolymer.

The polymeric sheet as defined above may be made of one layer of a polymer comprising COC/COP and other polymeric substances, it. may be a multilayer comprising at least one layer of COC/COP and at least one layer of other polymeric substances, or it may be a multilayer comprising at least one layer made of a blend of COC/COP and other polymeric substances.

The various layers may be attached to one another in any means known in the art per se, for instance, they may be co-extruded together with or without adhesive layers between them, they may be laminated by heat or glue, etc.

Non-limiting examples for non-COC/COP polymeric substances useful in the productions of polymeric sheets according to the invention are polyolefins, such as polyethylene and polypropylene; polystyrenes such as PS and SBC; and polyesters, such as PET or PETg.

Preferably, the shrinkage stage of the wrap around process in carried out in a steam tunnel.

A further advantage of using sheets comprising COC/COP as defined above in wrap-around labeling may be that the label follows bottle's shape without creasing, and offers excellent transparency of as low as 3.0% HAZE (ASTM D 1003) and all this is combined with relatively low price (thanks to the low COC/COP content) and with the high labeling speed provided by the wrap-around method.

Accordingly, a second aspect of the invention is an article enveloped with a polymeric sheet according to the invention, wherein the label was heat shrinked onto the article, preferably with steam. Furthermore, the article may be enveloped using the wrap-around method, sleeving method or any other applicable method known in the art.

Another use of sheets according to the invention is for packaging articles with a twisted polymeric sheet. Twisted packages are in common use in candies packaging. Accordingly, the present invention also provides an article, preferably a candy, twist-wrapped in a sheet according to the invention. Thus, according to a further aspect of the invention there is provided an article twist-wrapped with a stretched polymeric film as defined above. The film may be stretched in the machine direction, in the traverse direction, or in both directions. Articles wrapped with films stretched at least in the machine direction are preferred, and most preferred are such articles stretched in the short gap stretching method. The films used for twist wrapping preferably may comprise at most 50% COC, more preferably at most 40% COC, and most preferably, about 30% COC.

Thus, one embodiment of the invention is a method for wrapping an article, preferably a candy; the method comprising wrapping around said article a polymeric film and twisting said polymeric film in the vicinity of the edges of said article, characterized in that said film is a stretched polymeric film comprising COC/COP.

The polymeric sheet in accordance with the first aspect of the invention may have low density ($\rho_p$), i.e. less than the density of water ($\rho_w$), enabling the material from which the sheet is made to float when submerged in water, which is particularly useful in the separation of materials phase of a recycling process which utilizes water submersion for articles to be recycled.

Since the density of water is known to be about one gram per centimeter cubed (1 g/cm$^3$), and the density of COC/COP is greater than that, the content of COC/COP in the sheet, being less than 50% allows the sheet to have a density lower than that of the water, which is not the case with known shrinkable polymeric sheets comprising COC/COP, used in packaging.

Thus, in accordance with a third aspect of the invention there is provided a polymeric sheet adapted to undergo shrinkage in a monoaxial direction to 85% of it's original dimension or less (15% shrink or more) upon heating of the sheet to 100° C. or less and having a density less than the density of water.

In accordance with a fourth aspect of the invention there is provided a polymeric sheet may be adapted to undergo shrinkage in a monoaxial direction to 60% of it's original dimension or less (40% shrink or more) at temperatures that may be greater than 100° C. and having a density less than the density of water.

Both the third and fourth aspects of the invention may be constituted completely of materials other than COC/COP.

A sheet according to the third and fourth aspects of the invention may comprise of more than one material, in which case not all the materials necessarily need to have a density less than that of water as long as the total density of the sheet is less the density of water. In particular, at least one of the materials included in the sheet may have a density greater than the density of water. The material in the sheet having a density greater than the density of water may be, for example, polystyrene (PS) or PETg (Poly (ethylene terephthalate) glycol).

The invention also provides articles wrapped in polymeric sheets in accordance with the current aspect of the invention, in a wrap-around method and sleeving method.

DETAILED DESCRIPTION OF EXEMPLARY EMBODIMENTS

In order to better understand the invention and to see how it may be carried out in practice, some exemplary embodiments will now be described.

Example 1

A multi-layer polymeric film, 50 micrometers in thickness, was produced by a blown film process from two polyolefin resins. One of the resins was mLLDPE (metallocene linear low density polyethylene) produced by ExxonMobil and sold under the trade-name of EXCEED™ 1018CA, the density of which being 0.918 g/cm$^3$, and the other resin was COC produced by Ticona and sold under the trade-name of Topas®, the density of which being 1.02 g/cm$^3$. The multi-layer film was processed in a short-gap-stretching machine produced by Lenzing Aktiengesellschaft, described in U.S. Pat. No. 5,184,379, at a heating temperature of 90° C.-120° C. and a stretch ratio of 1:3 to produce a monoaxially heat shrinkable film.

This film was found to undergo shrinkage, in the monoaxial direction, to 20% of it's original dimension (80% shrink), upon heating to 100° C., and to 40% of it's original dimension (60% shrink) upon subsequent heating to 110° C.-120° C. and offered excellent transparency of as low as 3.0% HAZE (ASTM D 1003). The density of the film after shrinkage was about 0.96 g/cm$^3$.

The obtained film was used for wrapping a polyethylene bottle having a feminine figure shape with a maximal outer diameter of 6.84 cm and minimal outer diameter of 6.05 cm. The wrapping was carried out on a KRONES roll-fed shrink labeling systems type Krones Contiroll 745-C96, with a steam tunnel at temperature of 100° C., at 20,000 bottles per hour.

The wrapping was carried out as follows: the film was wrapped around a drum, cut to form a label, and glue was applied to the label's edges. Then the label was wrapped around the bottle such that one glued edge attached the label to the bottle and the edges were glued to each other. The label was heated as to shrink onto the bottle.

Example 2

A multi-layer polymeric film was prepared as in example 1, and was used for wrapping a mock-up bottle having a feminine figure shape with a maximal outer diameter of 6.84 cm and minimal outer diameter of 5.00 cm. The wrapping was carried out on a KRONES roll-fed shrink labeling systems type Krones Contiroll 745-C96, with a hot air tunnel at temperature of about 120° C., at 20,000 bottles per hour.

The wrapping was carried out as follows: the film was wrapped around a drum, cut to form a label, and glue was applied to the label's edges. Then the label was wrapped around the bottle such that one glued edge attached the label to the bottle and the edges were glued to each other. The label was heated as to shrink onto the bottle.

Example 3

A multi-layer polymeric film, 50 micrometers in thickness, was produced by a blown film process from different resins. A inner layer was produced of the same mLLDPE (metallocene linear low density polyethylene) described in Example 1. The inner layer of mLLDPE was disposed between two outer layers of identical composition. The outer layers were produced from the following blend of polystyrene resins: (i) General Purpose Polystyrene (GPPS) produced by The Dow Chemical Company and sold under the trade-name of STYRON_678E™ the density of which being 1.05 g/cm$^3$, and (ii) Styrene-butadiene Copolymer (SBC) produced by Chevron Phillips Chemical Company and sold under the trade-name of K-RESIN®, the density of which being 1.01 g/cm$^3$, and (iii) High Impact Polystyrene (HIPS) produced by Chevron Phillips Chemical Company and sold under the trade-name of VALERA MA8000 the density of which being 1.05 g/cm$^3$. The multi-layer film was processed in a short-gap-stretching machine produced by Lenzing Aktiengesellschaft, described in U.S. Pat. No. 5,184,379, at a heating temperature of 90° C.-120° C. and a stretch ratio of 1:4 to produce a monoaxially heat shrinkable film.

This film was found to undergo shrinkage in the monoaxial direction, to 85% of its original dimension (15% shrink) upon heating to 100° C., and to 40% of its original dimension (60% shrink) upon subsequent heating to 130° C.-140° C. The density of the film after shrinkage was about 0.97 g/cm$^3$.

The obtained film was used for wrapping a PET (polyethylene terephthalate) bottle having a feminine figure shape with a maximal outer diameter of 6.75 cm and minimal outer diameter of 5.94 cm. The wrapping was carried out on a KRONES roll-fed shrink labeling systems type Krones Contiroll 745-C96, with a hot air tunnel at temperature of about 120° C., at 20,000 bottles per hour.

The wrapping was carried out as follows: the film was wrapped around a drum, cut to form a label, and glue was applied to the label's edges. Then the label was wrapped around the bottle such that one glued edge attached the label to the bottle and the edges were glued to each other. The label was heated as to shrink onto the bottle.

In the current example the density of the multi-layer polymeric film from which the label is made is about 0.97 g/cm³ and the density of the PET material from which the bottle is about 1.3 g/cm³, therefore, the material that the label is capable of floating when submerged in water and the bottle is inclined to sink in water. Consequently the different components of the article may be separated in a recycling process which utilizes water submersion for such a purpose.

Example 4

A film was prepared as in example 1, but had a thickness of 25 micrometers. The transparency was excellent, as in the film of example 1.

The film was found to have the advantage of low back-twist, namely, after it is twisted, it has low tendency to release the twist. It was found that when a polymeric sheet according to the invention is twisted in 540 degrees (namely, one and a half full turns), the final twist achieved is of 375 degrees, which is slightly more than a full turn. A similar sheet but without the COC/COP provided final twist of 325 degrees, which is less than one turn. A similar sheet with the COC/COP but not stretched provided a final turn of 280°.

The film was successfully used for wrapping lollypops on an Aquarius™ machine.

Those skilled in the art to which this invention pertains will readily appreciate that numerous changes, variations and modifications can be made without departing from the scope of the invention mutatis mutandis.

The invention claimed is:

1. An article comprising:
   a polymeric film roll configured to be used in a machine direction labeling system;
   and wherein the film roll comprises: a multi-layer polymeric film formed by co-extruding an inner film layer and two outer film layers, wherein the inner film layer comprises polyethylene and the two outer film layers each comprise a blend of a polystyrene polymer and a polystyrene copolymer,
   wherein the film is monoaxially stretched in a machine direction of the film roll and has a density less than 1 g/cm³, wherein the density is calculated as follows:
      exposing the film to a temperature of 100° C. to shrink the film and measuring the density of the film after shrinkage,
   wherein the film is shrinkable in the machine direction of the polymeric film roll by at least 15% upon exposing the film to 100° C. with a steam tunnel, and
   wherein the film is shrinkable in a transverse direction of the polymeric film roll by less than 5% upon exposing the film to 100° C. with a steam tunnel.

2. The article of claim 1, wherein the polyethylene is low density polyethylene.

3. The article of claim 1, wherein the film is stretched by short gap stretching.

4. The article of claim 1, wherein the film has a thickness in a range about 40 µm to about 50 µm.

* * * * *